United States Patent
Roskind et al.

(10) Patent No.: US 9,384,348 B2
(45) Date of Patent: Jul. 5, 2016

(54) IDENTITY THEFT COUNTERMEASURES

(71) Applicants: James A. Roskind, Redwood City, CA (US); Aaron T. Emigh, Incline Village, NV (US)

(72) Inventors: James A. Roskind, Redwood City, CA (US); Aaron T. Emigh, Incline Village, NV (US)

(73) Assignee: James A. Roskind, Redwood City, CA (US)

( * ) Notice: Subject to any disclaimer, the term of this patent is extended or adjusted under 35 U.S.C. 154(b) by 0 days.

(21) Appl. No.: 13/743,220

(22) Filed: Jan. 16, 2013

(65) Prior Publication Data

US 2014/0201835 A1    Jul. 17, 2014
US 2016/0117504 A9    Apr. 28, 2016

Related U.S. Application Data

(66) Continuation of application No. 13/112,810, filed on May 20, 2011, now Pat. No. 8,381,293, which is a continuation of application No. 11/116,781, filed on Apr. 27, 2005, now Pat. No. 7,971,246, Substitute for application No. 60/568,744, filed on May 6, 2004.

(60) Provisional application No. 60/566,671, filed on Apr. 29, 2004, provisional application No. 60/612,132, filed on Sep. 22, 2004.

(51) Int. Cl.
*G06F 21/55* (2013.01)
*G06F 21/51* (2013.01)
*H04L 29/06* (2006.01)

(52) U.S. Cl.
CPC ............... *G06F 21/55* (2013.01); *G06F 21/51* (2013.01); *H04L 63/1441* (2013.01); *G06F 2221/2115* (2013.01)

(58) Field of Classification Search
None
See application file for complete search history.

(56) References Cited

U.S. PATENT DOCUMENTS

| | | | |
|---|---|---|---|
| 5,978,918 A | 11/1999 | Scholnick et al. | |
| 7,100,049 B2 | 8/2006 | Gasparini et al. | |
| 7,107,247 B2 | 9/2006 | Kinoshita et al. | |
| 7,395,241 B1 | 7/2008 | Cook et al. | |
| 7,451,487 B2 | 11/2008 | Oliver et al. | |
| 7,676,546 B2 * | 3/2010 | Hallam-Baker | 709/206 |
| 8,423,471 B1 * | 4/2013 | Emigh et al. | 705/51 |
| 8,561,167 B2 * | 10/2013 | Alperovitch et al. | 726/13 |
| 8,615,802 B1 * | 12/2013 | Dingle | G06F 17/2211 726/22 |
| 8,943,588 B1 * | 1/2015 | Speegle et al. | 726/22 |
| 2002/0103933 A1 * | 8/2002 | Garon et al. | 709/246 |
| 2002/0116344 A1 | 8/2002 | Kinoshita et al. | |
| 2002/0176610 A1 | 11/2002 | Okazaki et al. | |
| 2003/0101072 A1 | 5/2003 | Dick et al. | |
| 2003/0196114 A1 | 10/2003 | Brew et al. | |
| 2004/0073688 A1 | 4/2004 | Sampson | |
| 2004/0153663 A1 | 8/2004 | Clark et al. | |
| 2004/0205135 A1 * | 10/2004 | Hallam-Baker | 709/206 |
| 2004/0230448 A1 | 11/2004 | Schaich | |
| 2005/0076221 A1 * | 4/2005 | Olkin et al. | 713/176 |
| 2005/0076222 A1 * | 4/2005 | Olkin et al. | 713/176 |

(Continued)

OTHER PUBLICATIONS

Final Office Action mailed Jun. 30, 2009 in U.S. Appl. No. 11/116,781, 9 pages.
Non-Final Office Action mailed Sep. 18, 2008 in U.S. Appl. No. 11/116,781, 8 pages.
Non-Final Office Action mailed Oct. 1, 2010 in U.S. Appl. No. 11/178,161, 9 pages.

(Continued)

*Primary Examiner* — Michael R Vaughan
(74) *Attorney, Agent, or Firm* — Mahamedi IP Law LLP

(57) ABSTRACT

In some embodiments, techniques for computer security comprise preventing and/or mitigating identity theft such as phishing.

18 Claims, 17 Drawing Sheets

(56) References Cited

U.S. PATENT DOCUMENTS

| | | | |
|---|---|---|---|
| 2005/0183143 | A1 | 8/2005 | Anderholm et al. |
| 2005/0268100 | A1* | 12/2005 | Gasparini et al. ............. 713/170 |
| 2006/0123478 | A1* | 6/2006 | Rehfuss et al. ................. 726/22 |
| 2006/0242691 | A1 | 10/2006 | Meister |
| 2007/0005702 | A1* | 1/2007 | Tokuda ................... H04L 51/14 709/206 |
| 2007/0039038 | A1* | 2/2007 | Goodman et al. ................. 726/2 |
| 2007/0044149 | A1* | 2/2007 | Xavier et al. .................... 726/22 |
| 2007/0101423 | A1* | 5/2007 | Oliver et al. ..................... 726/22 |
| 2007/0245422 | A1* | 10/2007 | Hwang et al. ................... 726/26 |
| 2007/0294763 | A1* | 12/2007 | Udezue ................... G06F 21/51 726/22 |
| 2008/0313173 | A1* | 12/2008 | Popper ............................. 707/5 |
| 2009/0019037 | A1* | 1/2009 | Kumar et al. ..................... 707/5 |
| 2009/0064330 | A1* | 3/2009 | Shraim et al. ................... 726/22 |
| 2009/0089426 | A1* | 4/2009 | Yamasaki et al. ............. 709/225 |
| 2009/0307191 | A1* | 12/2009 | Li et al. ............................ 707/3 |
| 2010/0154058 | A1* | 6/2010 | Kay ................................. 726/26 |
| 2010/0306836 | A1* | 12/2010 | Hallam-Baker .................. 726/7 |
| 2010/0306845 | A1* | 12/2010 | Vaithilingam et al. .......... 726/23 |
| 2011/0191851 | A1* | 8/2011 | Largman et al. ................ 726/24 |
| 2011/0247070 | A1* | 10/2011 | Xavier et al. .................... 726/22 |
| 2012/0131187 | A1* | 5/2012 | Cancel et al. .................. 709/224 |
| 2013/0031628 | A1* | 1/2013 | Wang et al. ..................... 726/22 |
| 2013/0198376 | A1* | 8/2013 | Landa et al. ................... 709/224 |

OTHER PUBLICATIONS

Notice of Allowance mailed Feb. 17, 2011 in U.S. Appl. No. 11/116,781, 9 pages.
Final Office Action mailed May 20, 2011 in U.S. Appl. No. 11/178,161, 11 pages.
Final Office Action mailed Oct. 7, 2010 in U.S. Appl. No. 11/116,781, 13 pages.
U.S. Appl. No. 11/116,781, filed Apr. 27, 2005, Emigh et al.
Non-Final Office Action mailed Mar. 31, 2010 in U.S. Appl. No. 11/116,781, 11 pages.
Non-Final Office Action mailed Jun. 4, 2012 in U.S. Appl. No. 11/178,161, 7 pages.
Final Office Action mailed Jan. 21, 2010 in U.S. Appl. No. 11/178,161, 11 pages.
Non-Final Office Action mailed Mar. 30, 2009 in U.S. Appl. No. 11/178,161, 9 pages.
Notice of Allowance mailed Oct. 12, 2012 in U.S. Appl. No. 13/112,810, 11 pages.
Non-Final Office Action mailed Apr. 13, 2012 in U.S. Appl. No. 13/112,810, 7 pages.
Notice of Allowance mailed Dec. 4, 2012 in U.S. Appl. No. 11/178,161, 5 pages.

* cited by examiner

IDENTITY THEFT COUNTERMEASURES

CROSS REFERENCE TO RELATED APPLICATIONS

This application is a continuation of U.S. patent application Ser. No. 13/112,810, filed May 20, 2011 which is a continuation of U.S. patent application Ser. No. 11/116,781, filed Apr. 27, 2005, now U.S. Pat. No. 7,971,246, issued Jun. 28, 2011 which claims priority to:
(i) U.S. Provisional Patent Application No. 60/566,671, filed Apr. 29, 2004;
(ii) U.S. Provisional Patent Application No. 60/568,744, filed May 6, 2004; and
(iii) U.S. Provisional Patent Application No. 60/612,132, filed Sep. 22, 2004;
all of the aforementioned priority applications are hereby incorporated by reference in their entirety for all purposes.

FIELD OF THE INVENTION

The present invention relates generally to the area of electronic security. More specifically, techniques for preventing and/or mitigating the compromise of information are disclosed.

BACKGROUND OF THE INVENTION

An increasing volume of confidential information, such as personal and financial information, is being stored electronically, in locations accessible through electronic networks such as the internet. This information has value to parties who have illicitly gained access to such information. Current email and web browser technology do not provide adequate defenses against information compromise.

Accordingly, there is a need to protect users from electronic fraud.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
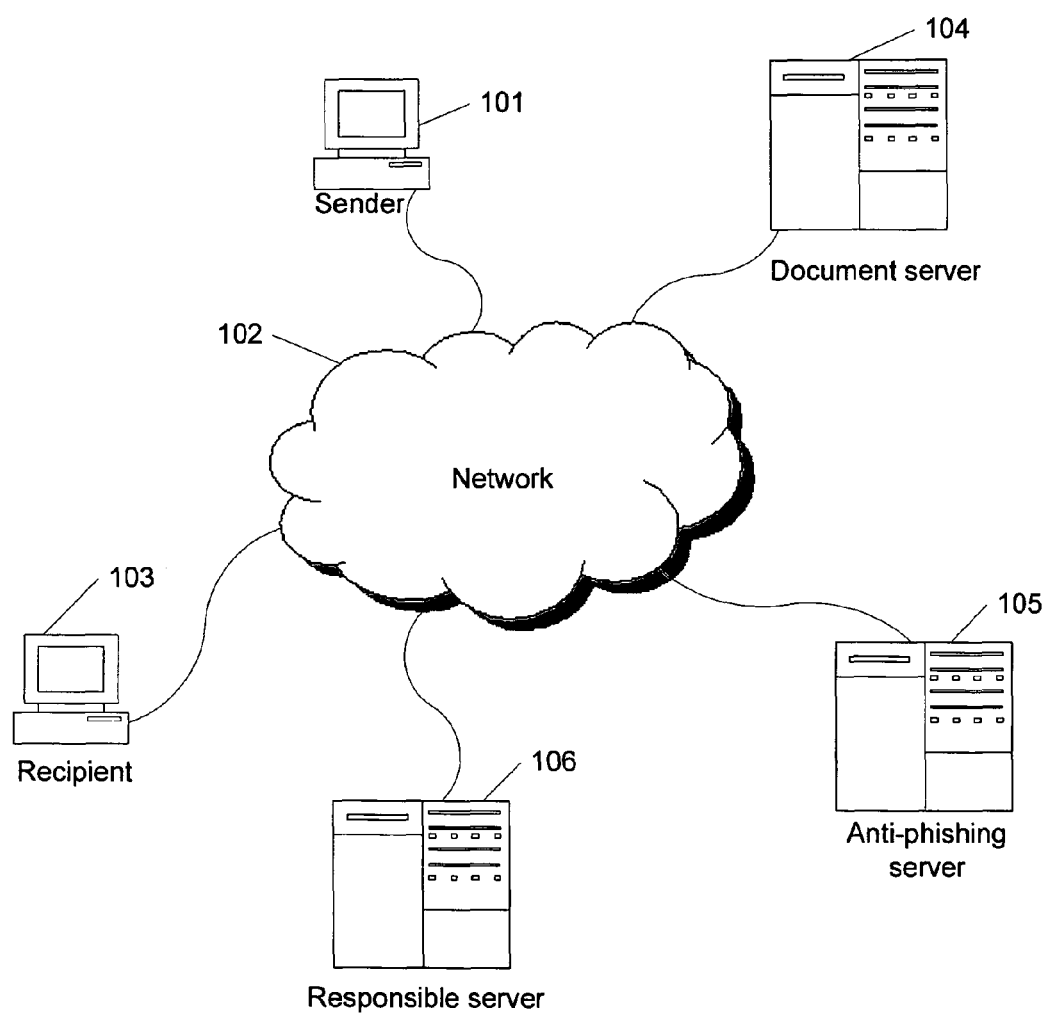
FIG. 1 is a diagram of a system for performing identity theft countermeasures, according to some embodiments.

FIG. 1 is a diagram of a system for performing identity theft countermeasures, according to some embodiments. In this example, a sender of a message 101 may be connected to a network 102. A sender may be any device capable of sending a message, including a personal computer, PDA, or a cell phone. A sender 101 may also be a server such as a mail server receiving a message from a sender device. In some embodiments, a sender 101 may be a participant in a network of computers that are controlled by an external party, such as a "bot" or "zombie" network. A message refers herein to any electronic communication that may be addressed to a user, or that may be automatically delivered to a user as a result of a subscription. Examples of a message include email, an instant message, an SMS text message, an RSS message, an Atom message, a message including streaming video, and a Bluetooth message. A sender 101 may send a message relating to identity theft, such as a phishing message, through the network 102 to a recipient 103.

Identity theft refers herein to the misappropriation of any confidential information, such as information related to identity. Examples of information related to identity include a user name, a password, a financial identifier such as a credit card number or bank account number, a social security number, a driver's license number, medical information, and personal information such as a mother's maiden name, birthday or place of birth. Phishing refers herein to any electronic communication designed to lead to a compromise of confidential information, and may also be used interchangeably with identity theft. Examples of phishing include a deceptive message, a message including malicious code that may compromise information, or any other communication that may lead to an information compromise. Examples of electronic communication include any type of electronic message, and conveying any type of electronic document. Illustrative examples of phishing include a message sent purporting to be from Paypal requiring a user to enter an account name and password for a security audit, a sweepstakes message indicating that a user has won a prize and must enter credit card information to verify identity, a faked message from a manager inviting an employee to an outing but requiring the employee's corporate password to accept or decline, a faked message from management indicating additional work hours have been approved but requiring a worker's corporate password to disavow a commitment to work, a faked message from an online bank or stock brokerage requiring account and password information before a real or fictitious "transaction" can be confirmed or denied, a fake banking web site indexed by a search engine, and a message associated with malicious software intended to compromise information, such as a keylogger or web Trojan.

The network 102 may be any type of network, for example a public network such as the internet or a cellular phone network. In another example, the network 102 may be an enterprise or home network, a virtual private network, or a wireless network such as an 802.11 or Bluetooth network. In some embodiments, the network 102 may include more than one network. An example of a network 102 including more than one network is a local area network connected to a public network such as the internet. A recipient 103 of a message such as a phishing message may be connected to the network 102. A recipient may be any device capable of receiving a message, including a personal computer, PDA, or cell phone. A recipient may also refer herein to a user of a device capable of receiving a message, or a server transmitting a message to a recipient device. In some embodiments, phishing countermeasures may be performed by the recipient 103.

A document server 104 may be connected to the network 102. The document server 104 may be any entity capable of providing a document, such as a web server that provides a document through a protocol such as HTTP. The document server 104 may provide phishing documents. A document refers herein to any data that may be referenced by an address, including a file on a computer filesystem, an entry in a database table, a web page, and dynamically generated data provided by a server such as an HTTP server.

An anti-phishing server 105 may be connected to the network 102. An anti-phishing server may provide resources and/or services for preventing identity theft. One example of an anti-phishing server is a server that stores and/or distributes reports of fraudulent messages or documents, for example as discussed in conjunction with 301 of FIG. 3. Another example of an anti-phishing server is a server that processes reports of confidential information compromises, for example as discussed in conjunction with 408 of FIG. 4 and FIG. 5. Another example of an anti-phishing server is an image registration server, for example as discussed in conjunction with FIGS. 11 through 16. In some embodiments, an anti-phishing server 105 and recipient 103 may be within an enterprise network such as a LAN or virtual private network.

Figure 4:
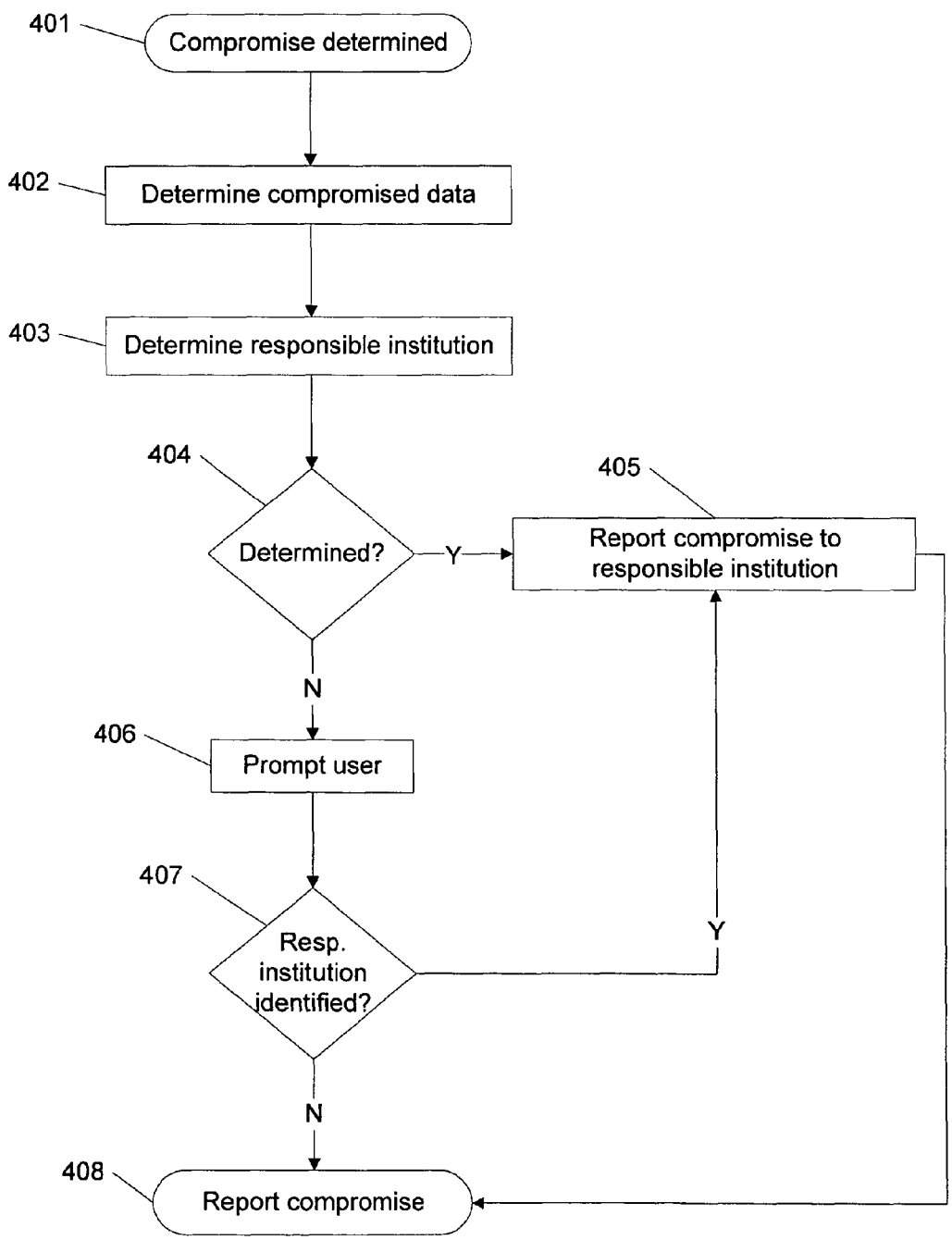
FIG. 4 is a flow diagram of a method for processing a compromise, according to some embodiments.
Figure 5:
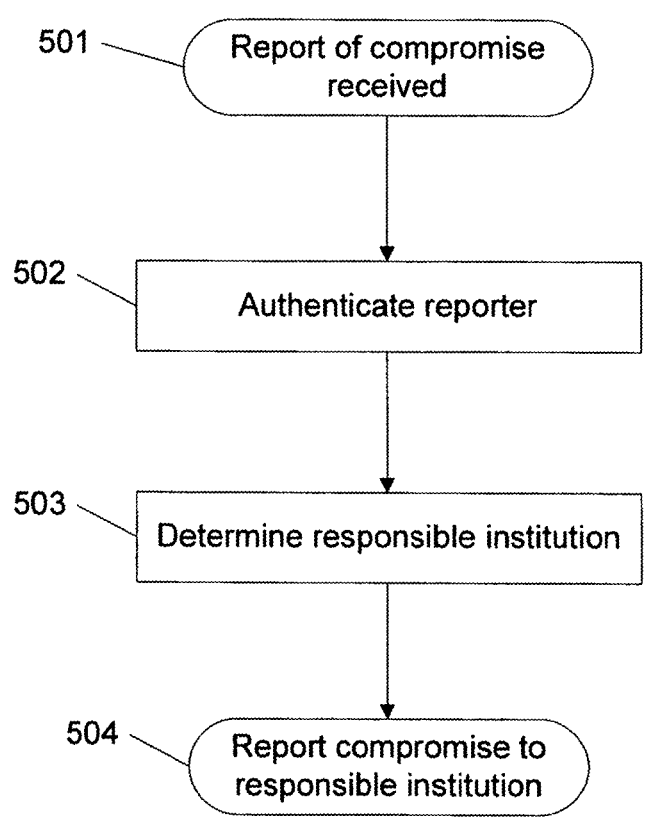
FIG. 5 is a flow diagram of a method for reporting a compromise by a service, according to some embodiments.

In some embodiments, a responsible server 106 may receive reports of information compromises for which it is responsible or can play a role in processing, for example as described in conjunction with 405 of FIG. 4 and 504 of FIG. 5. Examples of a responsible server include a server associated with a financial institution such as a bank, a server associated with a corporate intranet, and any other server that may be associated with an issuer of confidential information or a target of fraud relating to misuse of confidential information.

Figure 2:
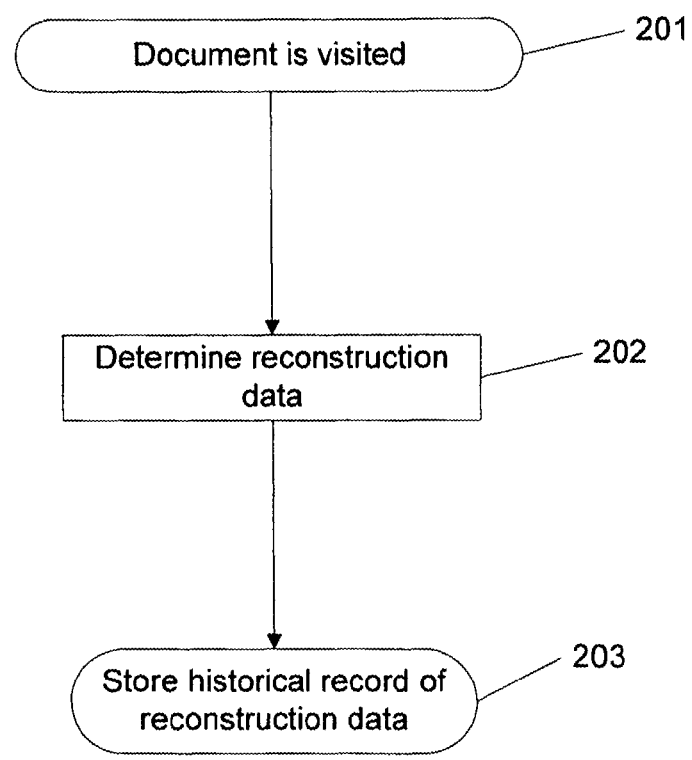
FIG. 2 is a flow diagram of a method for retaining an informational audit trail, according to some embodiments.

FIG. 2 is a flow diagram of a method for retaining an informational audit trail, according to some embodiments. In this example, a document may be visited (201). A web page is an example of a document. Visiting a document refers herein to causing a document to be loaded and/or displayed. Examples of visiting a document include clicking on a link in a document such as an email or a web site, submitting a web form, and typing an address into the URL bar.

Reconstruction data may be determined (202). Reconstruction data may include one or more of a URL associated with the document being visited; a URL associated with the next document visited; a link used, if any; a protocol and optional associated security level associated with the visitation, such as FTP, HTTP, HTTPS, etc., as well as optionally security information such as server authentication data of an HTTPS server; any data such as form data that is sent; data captured by logging keystrokes, mouse actions and/or other inputs while the document is being visited; and any mode (such as POST or GET) used to send data; and information relating to any redirections occurring during link traversal.

A historical record of the reconstruction data may be stored in an audit repository (203). An audit repository refers herein to any storage used for storing a history associated with documents that have been visited. An audit repository may be any data repository, for example a file stored on a user's hard drive or a file associated with a system administrator, which may in some embodiments be accessed via a network such as the internet or a corporate intranet. An example of an audit repository is a history of browsed documents maintained by a document browser such as a web browser. In some embodiments, an audit repository may be kept in a directory such as C:\Documents and Settings\<username>\Local Settings\History. An audit repository may optionally be encrypted, either programmatically or by being stored on an encrypted filesystem. In some embodiments, reconstruction data may be processed to enhance privacy, for example by hashing using a cryptographic hash such as SHA1 or MD5. In some embodiments, older audit information may be removed from the audit file, for example on a regular period such as daily or weekly or according to a configuration setting, or when an audit file grows beyond a size threshold.

Figure 3:
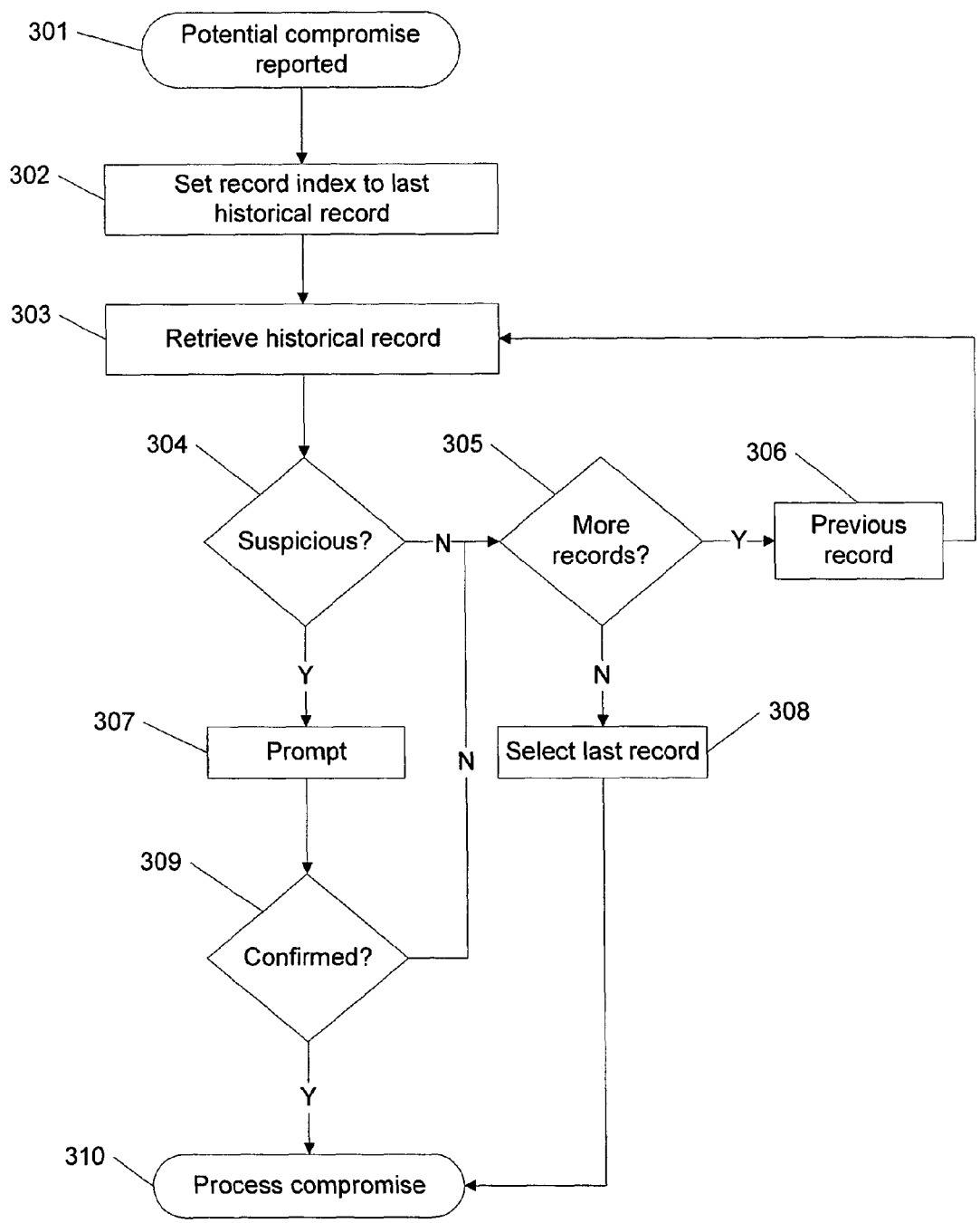
FIG. 3 is a flow diagram of a method for reconstructing a compromise, according to some embodiments.

FIG. 3 is a flow diagram of a method for reconstructing a compromise, according to some embodiments. In this example, a potential compromise is reported (301). One example of reporting a potential compromise is for a user to report a compromise through a user interface element. An example of a user interface element is an element associated with a document browser such as a web browser, such as a button with a suggestive icon and/or a caption such as "I got taken," which may be selected to report that information has been compromised. Another example of reporting a potential compromise is to receive information from an external source, such as an anti-phishing server 105 of FIG. 1, relating to a fraudulent document. An example of information relating to a fraudulent document is information relating to a location of a fraudulent document, such as a URL. Another example of information relating to a fraudulent document is information relating to contents of a fraudulent document, such as a signature (for example a hash) of document contents.

In some embodiments, information relating to a fraudulent document may include information relating to a responsible institution, for example an institution that is impersonated by the fraudulent document. An example of information relating to a responsible institution is the name of the institution. Another example of information relating to a responsible institution is a specification of a mechanism for reporting an information compromise, such as an address such as a URL or site and optionally a protocol to use in reporting a compromise. In various embodiments, an external source of information relating to a fraudulent document may be a company that charges a subscription fee to provide such information, or a peer-to-peer reporting service. In some embodiments, information relating to multiple fraudulent documents may be received together and processed, for example sequentially as described in this FIG. 3.

A record index may set to point to an initial record in an audit repository, for example the last (latest) record (302). A historical record corresponding to the record index may be retrieved from the audit depository (303). It may be determined whether the record is suspicious (304). Examples of reasons a record may be considered suspicious include always considering a record suspicious, considering a record suspicious in which form data is submitted, considering a record suspicious in which form data was submitted to a suspicious URL or over an unencrypted connection, considering a record suspicious if its URL corresponds to a known "bad" site such as a site reported as discussed in conjunction with 301, considering a record suspicious if form data corresponding to stored user account data was transmitted, considering a record suspicious if it is related to a reported location of a fraudulent document or site, and considering a record suspicious if it is related to reported contents of a fraudulent document.

If the record is determined to be suspicious (304), then in this example a prompt may optionally be presented to determine whether the record was indeed where data was compromised (307). Prompting may, for example, include presenting a URL and optionally data that was compromised, and providing two user interface elements, one indicating that the record displayed was the point at which data was compromised, and another indicating that the record displayed was not the point at which data was compromised.

If it is confirmed that the record is the point at which data was compromised (309), for example by a user confirming through a user interface element, or if no user interface was presented, then the compromise is processed in this example (310). An example of processing a compromise is discussed in conjunction with FIG. 4.

If the record is not confirmed as the point of data compromise (309), or if the record was not considered suspicious (304), then the audit repository is checked in this example to determine whether more records are available to be processed, for example by determining whether the record index is pointing to the first (earliest) record (305).

If it is determined that more records remain to be processed (305), then in this example a next record is selected to be processed, for example the chronologically previous (earlier) message (306), and the record is retrieved and processed (303).

In some embodiments, for example in some embodiments in which the potential compromise report was initiated by a user, if it is determined that no more records remain to be processed (305), then in this example the last (latest) record is selected (308), and the compromise is processed (310).

FIG. 4 is a flow diagram of a method for processing a compromise, according to some embodiments. In this example, a compromise is determined (401). An example of determining a compromise is discussed in conjunction with FIG. 3. In some embodiments, a compromise may be determined when it is determined that malicious software is installed on a computer, for example by running a scanner such as a malware scanner or virus scanner.

It may be determined what data is associated with the compromise (402). One example of determining information associated with the compromise is to use information associated with a record in an audit repository, for example an audit repository selected as described in conjunction with 303 of FIG. 3. Another example of determining information associated with the compromise is to analyze data associated with malicious software, such as data kept by a keylogger or web Trojan. A keylogger refers herein to malicious software that logs keystrokes, for example keystrokes associated with confidential information entered at targeted web sites. A web Trojan refers herein to malicious software that simulates a document such as a web page and retains or forwards information entered on the simulated document. Another example of determining information associated with the compromise is to analyze log data, for example data kept by an operating system or network monitoring. Another example of determining information associated with the compromise is to provide a user interface element that may receive one or more inputs relating to compromised data, such as an account name.

A responsible institution may be determined (403). An example of determining a responsible institution is to look up compromised data, for example by determining whether compromised data is contained in a database containing confidential data such as account name/numbers and passwords and credit card data, associated with information about a responsible institution. A responsible institution refers herein to an entity for which associated data may be used. For example, a responsible institution of a credit card number may be the bank that issued the card; and a responsible institution of an eBay username/password pair may be eBay. Another example of determining a responsible institution is to use a fixed responsible institution, such as a security company that offers a compromise reporting service on a subscription basis. An example of the operation of a fixed responsible institution is discussed in conjunction with FIG. 5.

Another example of determining a responsible institution is to determine a targeted institution. A targeted institution refers herein to an institution that is associated with compromised information. Examples of possible targeted institutions include a financial institution such as a bank, a brokerage, a corporate VPN or intranet, an e-commerce company, an auction company, and a web-based payment company. One example of determining a targeted institution is to analyze information associated with the compromise, for example information discussed in conjunction with 402. Another example of determining a targeted institution is to receive information relating to a targeted institution in a notification of a potential compromise, for example as described in conjunction with 301 of FIG. 3.

If a responsible institution was determined (404), then a compromise may be reported to the responsible institution (405). An example of reporting a compromise to the responsible institution is to report the compromise to a responsible server 106 of FIG. 1, wherein the responsible server is associated with the responsible institution. In some embodiments, a mechanism for reporting a compromise may be stored locally, for example associated with the responsible institution. In some embodiments, a mechanism for reporting a compromise may be determined by consulting a central authority such as an anti-phishing server 105 of FIG. 1. An example of consulting a central authority is to transmit information relating to a responsible institution, such as an identifier, and receiving compromise submission mechanism information associated with the responsible institution. In some embodiments, a mechanism may be specified in a report of a potential compromise, for example as described in conjunction with 301 of FIG. 3.

In some embodiments, a compromise may be reported electronically, for example by optionally encrypting compromised account data with a public key associated with a responsible institution and transmitting it to the responsible institution. An example of transmitting a report is to transmit the report through a network such as the internet or an intranet, for example using a networking protocol such as TCP/IP. In some embodiments, a report may be provided using a mechanism specified in a report of a potential compromise, for example as described in conjunction with 301 of FIG. 3. In some embodiments, authentication data may be included, for example standard authentication information, or authentication information specific to a responsible institution, for example because an institution always requires specific authentication information or because a user has determined specific authentication information to be used with an institution. Examples of such authentication information include a password, a second-factor authentication device such as a time-varying password, USB password device, biometric data, data stored on a personal computer, or personal information that can be associated with the responsible institution. In some embodiments, a user may be prompted to answer authentication questions and user input may be collected and sent along with the compromise data.

In some embodiments, a compromise may be reported manually, for example by directing a user to a web site associated with a responsible institution, which may for example provide a form that may be filled out.

A responsible institution may optionally take action based on a compromise submission, including invalidating an account, changing an account number such as a credit card number or bank account number, changing a password associated with an account and providing the owner of the account with new password information, and/or calling the owner of the account. For example, a responsible institution may call only a number associated with the account, or may call a number input by the user, and authenticate the identity of the reporter of the compromise. One business model for a compromise reporting service includes reporting compromises to responsible institutions and charging a per-compromise fee for compromises, or confirmed compromises, or that have confirmed account data. In some embodiments, as an alternative to or in addition to an electronic compromise reporting interface address, a responsible institution may provide another mode of address, for example a phone number, which may enable a compromise report to be made.

Data relating to the compromise may be reported (408). Reporting a compromise can include sending compromise data to an authority that monitors fraud reports, for example a central authority such as an anti-phishing server 105 of FIG. 1. An example of providing a report is to transmit the report through a network such as the internet or an intranet, for example using a networking protocol such as TCP/IP. Examples of data relating to the compromise include a URL to which data was submitted, one or more URL's linking to a URL to which data was submitted, and information about a message that contained a URL that led to a compromise, for example the sender, return path, contents and/or one or more content signatures such as checksums.

If a responsible institution associated with the compromised data is not determined (404), a user may optionally be prompted to identify a responsible institution (406). For example, a list of responsible institutions may be provided to the user in a scrollable list, and the user may select one, or specify that the responsible institution is unknown or is not on the list. If the user selects a responsible institution (407), a compromise is reported to the responsible institution in this example (405) and a compromise is reported in this example (408). If the user does not select a responsible institution, a compromise is optionally reported to a third party such as an authority in this example (408).

FIG. 5 is a flow diagram of a method for reporting a compromise by a service, according to some embodiments. In some embodiments, the service may be associated with an anti-phishing server 105 of FIG. 1. In this example, a report of a compromise is received (501). In some embodiments, a report may have been sent as discussed in conjunction with 405 or 408 of FIG. 4. A report may include information associated with the compromise, such as data that was transmitted in the compromise.

A reporter of the compromise may be authenticated (502). An example of authenticating the reporter is to determine that the reporter has not reported an excessive number of compromises, for example by comparing a number of reported compromises with a threshold number of compromises such as ten in the most recent month. Another example of authenticating the reporter is to communicate with a Trusted Computing component associated with the reporter and confirming that the reporter is authorized to report a compromise, for example because the reporter is associated with authorized computer software. Another example of authenticating the reporter is to verify authentication information such as a password, personal information, or information associated with a second-factor authentication device such as a time-varying or sequential code or biometric authentication information.

A responsible institution associated with the compromise may be determined (503). Examples of determining a responsible institution associated with the compromise are discussed in conjunction with 403 of FIG. 4. The compromise may be reported (504). Examples of reporting a compromise to a responsible institution are discussed in conjunction with 405 of FIG. 4. In some embodiments, a mapping such as a database may be maintained in which targeted institutions are mapped to mechanisms for reporting a compromise. A mechanism may include an address and optionally a protocol. An example of an address for reporting a compromise is a URL, IP address or other network-reachable address. An example of a protocol is an indication of a data format, such as an XML schema, form data submission specification, or an identifier associated with a predetermined protocol.

Figure 6:
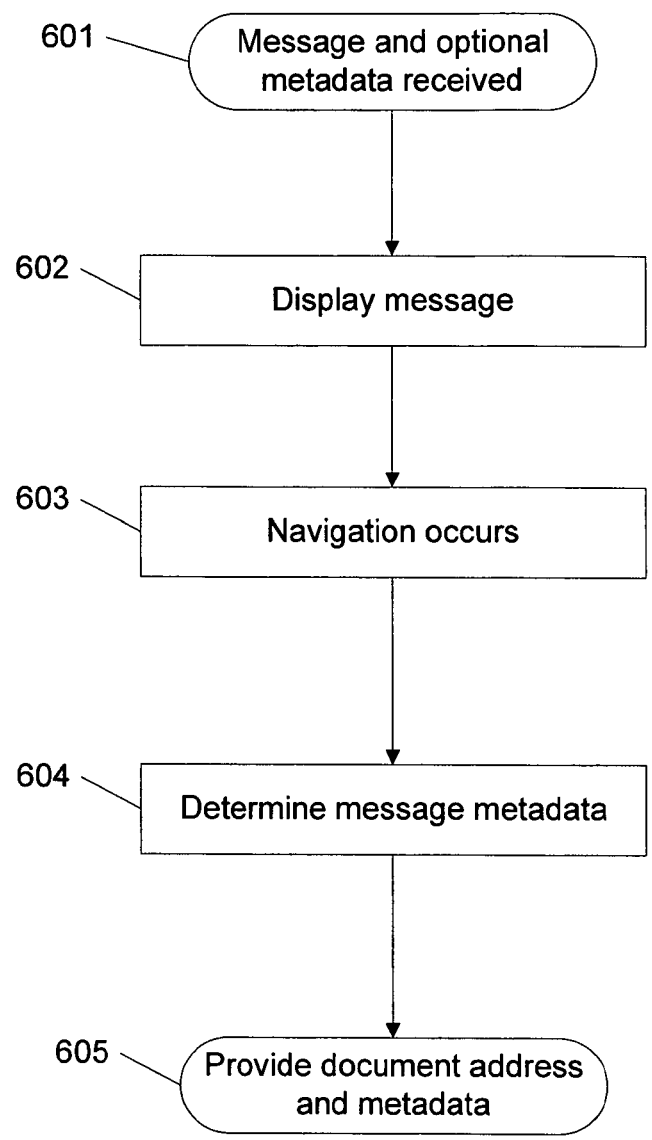
FIG. 6 is a flow diagram of a method for sharing message metadata, according to some embodiments.

FIG. 6 is a flow diagram of a method for sharing message metadata, according to some embodiments. In some embodiments, the method of this FIG. 6 may be performed by a messaging client application such as an email client. In this example, a message and optional metadata are received (601). An example of a message is an email message. Metadata of a message refers herein to any information that characterizes contents, attributes or history of the message. An example of metadata is information related to a message classifier such as a spam filter, for example information about the analyzed spam likelihood or fraud likelihood of a document, and/or information relating to other aspects of the message, such as whether a sender associated with the message was authenticated and/or whitelisted. Such information may, for example, be included in the header of a message or as separately provided metadata.

The message may be displayed (602). Navigation may occur (603). An example of navigation is selection of a link associated with the message.

Message metadata may be determined (604). Examples of message metadata include the sender of the message, elements of the return path of the message (for example the IP address of a server such as a Mail Transfer Agent from which a message was received), message contents, and information about specific qualities of a message such as whether it was cryptographically signed and whether it was verified by a verification protocol such as SPF, Domain Keys or Sender ID, a classification associated with a sender of the message such as whether the sender was whitelisted, and/or a spam classifier or suspicion score. In some embodiments, message metadata may include metadata received as described in conjunction with 601.

A document address such as a URL associated with the link may be provided along with the message metadata (605). An example of providing a document address and associated metadata is to transmit a URL and associated metadata to a browser client such as a web browser for document retrieval and rendering.

Figure 7:
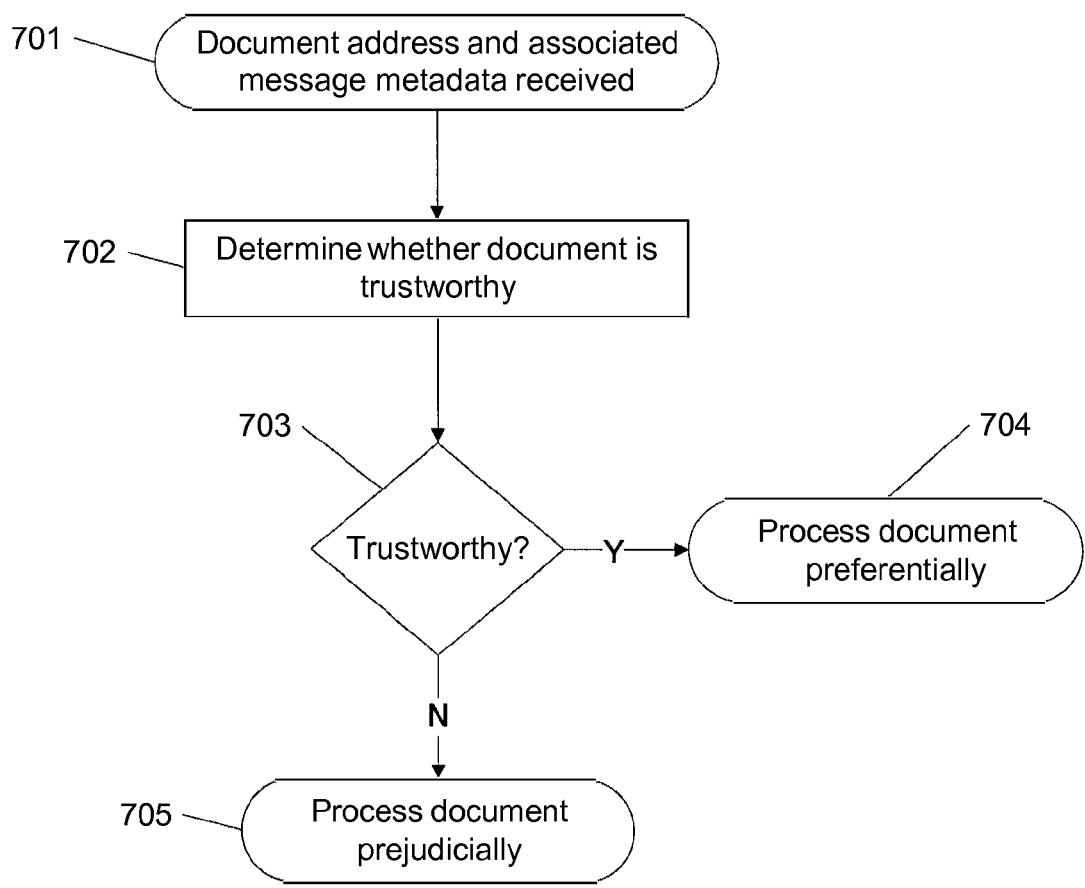
FIG. 7 is a flow diagram of a method for processing a document with referrer metadata, according to some embodiments.

FIG. 7 is a flow diagram of a method for processing a document with referrer metadata, according to some embodiments. In some embodiments, the method of FIG. 7 may be performed by a document browser such as a web browser. In this example, a document address such as a URL is received with associated metadata relating to a message associated with the document address (701). In some embodiments, the document address and associated message metadata may have been provided as discussed in conjunction with 605 of FIG. 6.

It may be determined whether the document is trustworthy (702). An example of determining whether the document is trustworthy is to use the message metadata, for example by considering a document untrustworthy if it is associated with a high spam score for the associated message, or if the URL was suspicious, for example using unnecessary UTF-8 character encodings or containing an embedded username, or if the associated message was not authenticated.

If it is determined that the document is trustworthy (703), then the document is processed preferentially in this example (704). An example of processing the document preferentially is to retrieve and display the document. Another example of processing the document preferentially is to allow form submissions associated with the document, or to allow form submissions without a warning. Another example of processing the document preferentially is to display the document with a visual or auditory indication that the document is trustworthy, such as a green light or border. In some embodiments, documents subsequently selected by navigating from the document, or retrieved from the same domain or subdomain as the document, may be treated preferentially.

If it is determined that the document is not trustworthy (703), then the document is processed prejudicially in this example (705). An example of processing the document prejudicially is not to retrieve and display the document, or to issue a warning before retrieving and/or displaying the document. Another example of processing the document prejudicially is to disallow form submissions associated with the document, or to display a warning before submitting form data. Another example of processing the document prejudicially is to display the document with a visual or auditory indication that the document is not trustworthy, such as a red light or border. In some embodiments, documents subsequently selected by navigating from the document, or retrieved from the same domain or subdomain as the document, may be treated prejudicially.

Figure 8:
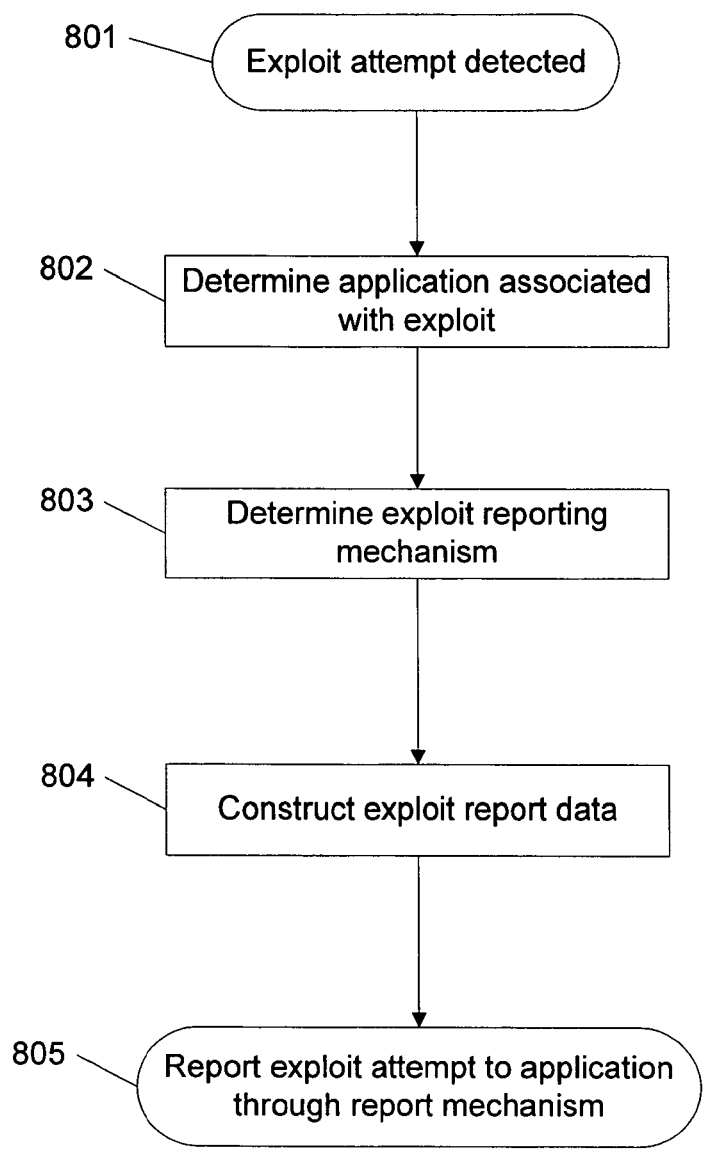
FIG. 8 is a flow diagram of a method for reporting an exploit attempt, according to some embodiments.

FIG. 8 is a flow diagram of a method for reporting an exploit attempt, according to some embodiments. An exploit refers herein to utilizing a security vulnerability. Examples of exploits include buffer overruns, unauthorized privilege escalations, denials of service, code injection, accessing data not within the privileges of the code, and any other disallowed activities. In this example, an attempted exploit is detected (801). An exploit may, for example, be detected by a sensor. A sensor refers herein to any method for detecting an attempted exploit. In some embodiments, a sensor may be a security layer that detects exploit attempts, such as Microsoft Shield, information about which is available over the internet from Microsoft Research. In some embodiments, a sensor may be a component of code in which a security vulnerability, or former security vulnerability, exists, which detects an attempted exploit. A component sensor may, for example, be part of a patch to fix a vulnerability that also senses attempted exploits. In some embodiments, a sensor may detect exploits that occur at a low level, by pre-processing directives at a higher level. For example, length or semantic characteristics of data provided to a program or system call may be checked to determine whether it is exploitive. An example of exploitive data is data that exceeds a predetermined length associated with the program or system call to which an attempt is being made to provide it.

An application associated with the exploit attempt may be determined (802). An example of determining an application associated with the exploit attempt is to determine a memory address of code associated with the exploitive call, for example by examining the stack and determining the topmost return address on the stack associated with an application, and determining an application associated with the address, for example by determining what application's code segment is associated with the address. In cases in which the code segment is associated with a shared library, it may be recursively determined what application called the shared library.

An exploit reporting mechanism may be determined (803). One example of determining an exploit reporting mechanism is to use a fixed exploit reporting mechanism, such as a signal, exception, or message that all applications may receive and/or process. Another example of determining an exploit reporting mechanism is to provide a predetermined return code associated with an exploit attempt. Another example of determining an exploit reporting mechanism is to use a reporting mechanism that has been registered by the application, for example by registering a callback address provided via a call to the component or function through which an exploit is being attempted or via an operating system call, or by subscribing to one or more classes of exploit attempts, either globally when the application is running or when the application is running in one or more predetermined sections of code.

A report containing data related to the attempted exploit may be constructed (804). Examples of data relating to the attempted exploit include an identification of the exploit or class of exploit, and one or more addresses associated with data or code relating to the exploit.

The exploit attempt may be reported to the application through the reporting mechanism (805). Examples of reporting mechanisms are discussed in conjunction with 803. Reporting the exploit attempt may include calling a callback function, calling a function that has been registered to subscribe to exploit reports, returning a predetermined return code, and sending a predetermined signal, exception, or message to the application.

Figure 9:
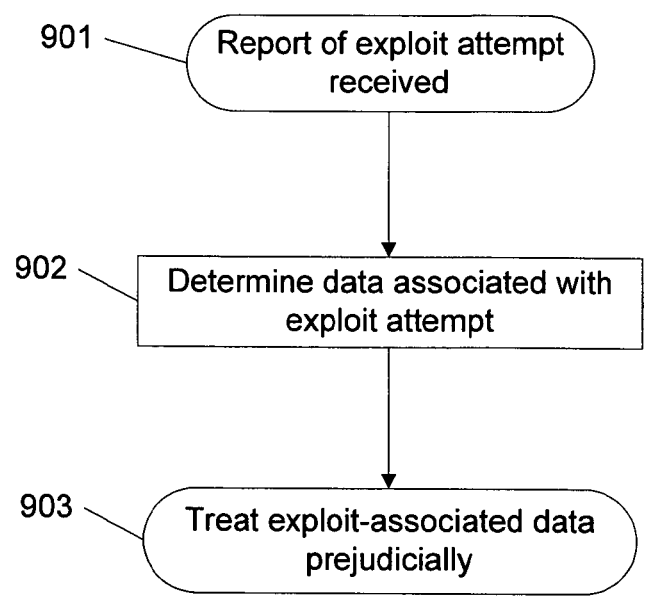
FIG. 9 is a flow diagram of a method for processing an exploit attempt report, according to some embodiments.

FIG. 9 is a flow diagram of a method for processing an exploit attempt report, according to some embodiments. In this example, a report of an attempted exploit is received (901). In some embodiments, the report may have been constructed and sent as described in conjunction with FIG. 8. Examples of mechanisms through which an exploit attempt may be sent and received are discussed in conjunction with 803 of FIG. 8.

Data associated with the exploit attempt may be determined (902). An example of determining data associated with the exploit attempt is to determine a document that contained an attempted exploit, for example by determining a document containing data indicated in the report. Another example of determining data associated with the exploit attempt is to determine a loadable module of code that attempted the exploit.

Data associated with the exploit attempt may be treated prejudicially (903). An example of treating the data prejudicially is to close or not display a document associated with the exploit attempt. Another example of treating the data prejudicially is to display a warning user interface element. Such a user interface element may optionally provide options on what actions to take, for example continuing to use the data, discarding the data, or ceasing to trust data received from the source of the data. Another example of treating the data prejudicially is to disable a loadable code module associated with the attempted exploit. Another example of treating the data prejudicially is to provide a visual or audible indication that data is untrustworthy, for example a red light or border displayed in a web browser when viewing a web page that has attempted an exploit. Another example of treating the data prejudicially is to restrict functionality of a document associated with an exploit attempt, for example by disallowing or interfering with scripts or form data submission.

Figure 10:
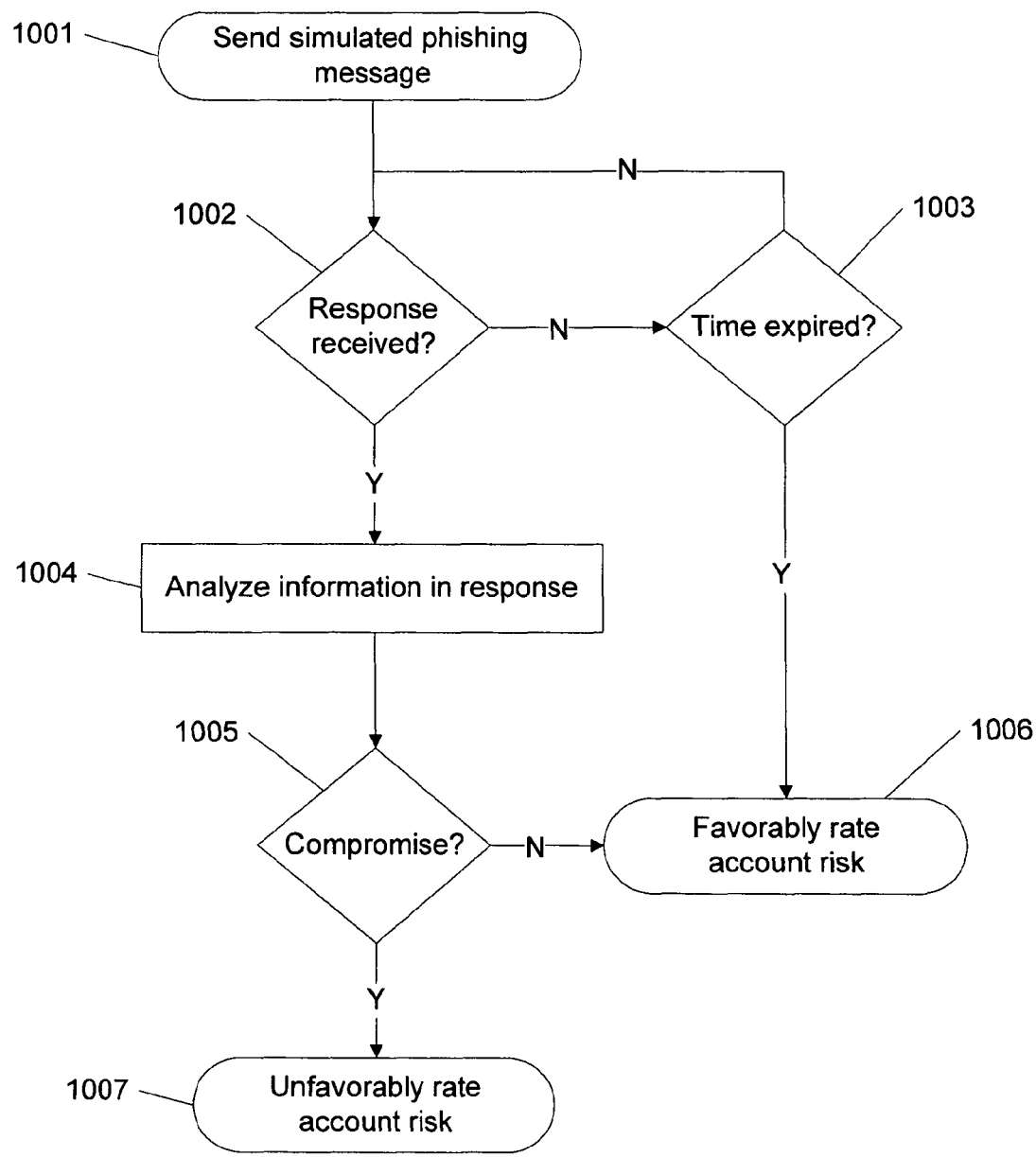
FIG. 10 is a flow diagram of a method for adjusting account risk based on a phishing response, according to some embodiments.

FIG. 10 is a flow diagram of a method for adjusting account risk based on a phishing response, according to some embodiments. In this example, a simulated phishing message is sent (1001). A simulated phishing message refers herein to a message similar to a phishing message, sent by a non-malicious party. In some embodiments, a simulated phishing message may be sent by an institution that maintains risk profiles, such as a credit rating institution or a financial institution such as a bank or credit card issuer; or an affiliate of any such institution.

It may be determined whether a response to the phishing message has been received (1002). An example of determining whether a response has been received is to check to see whether data has been entered on a web page that was referred to by the message. One example of determining whether data has been entered corresponding to the message is to encode a message identifier in a URL and monitor when the URL is accessed. Another example of determining whether data has been entered corresponding to the message is to determine whether account information corresponding to the messaging address to which the message was sent has been entered, for example account information belonging to an account holder associated with the messaging address.

If no response has been received (1002), then it is determined in this example whether a time limit has been reached since the message was sent (1003). An example of a time limit is two weeks from the sending of the message. If it is determined that the time limit has been reached (1002), then account risk associated with one or more account holders associated with the messaging address to which the message was sent is favorably adjusted in this example (1006). An example of favorably adjusting account risk is to increase a credit score associated with the account holder. Another example of favorably adjusting account risk is to maintain or increase an account holder's credit limit, or to make future credit limit increases more likely. Another example of favorably adjusting account risk is to make favorable changes to internally used approval metrics (for example, via Fair Isaac Falcon Fraud Manager) rendering real-time charge approvals more likely in the future. Another example of favorably adjusting account risk is to inform an agency providing scoring services (for example Fair Isaac's FICO service) that the account holder has successfully resisted a phishing scam, which may be factored into the customer's score.

If a response is received (1002), then in this example information associated with the response is analyzed (1004). An example of analyzing information in the response is to determine whether a compromise has occurred, for example by determining whether the information provided is correct or if false information has been provided. If it is determined that a compromise has not occurred (1005), for example because correct information was not compromised, then account risk associated with one or more account holders associated with the messaging address to which the message was sent is favorably adjusted in this example (1006), for example as discussed in the preceding paragraph.

If it is determined that a compromise has occurred (1005), for example because compromised information is determined to be correct, then account risk associated with one or more account holders associated with the messaging address to which the message was sent is unfavorably adjusted in this example (1007). An example of unfavorably adjusting account risk is to decrease a credit score associated with the account holder. Another example of unfavorably adjusting account risk is to cancel or suspend credit privileges associated with the account holder. Another example of unfavorably adjusting account risk is to maintain or decrease an account holder's credit limit, or to make future credit limit increases less likely. Another example of unfavorably adjusting account risk is to make unfavorable changes to internally used approval metrics (for example, via Fair Isaac Falcon Fraud Manager) rendering real-time charge approvals less likely in the future. Another example of unfavorably adjusting account risk is to inform an agency providing scoring services (for example Fair Isaac's FICO service) that the account holder has fallen victim to a phishing scam, which may be factored into the customer's score. In some embodiments, an educational message regarding phishing scams may be provided to the account holder, either in addition to or instead of unfavorably adjusting an account risk. In some embodiments, such a message may be sent whenever a compromise associated with an account is detected or reported, for example in response to a genuine phishing message.

Figure 11:
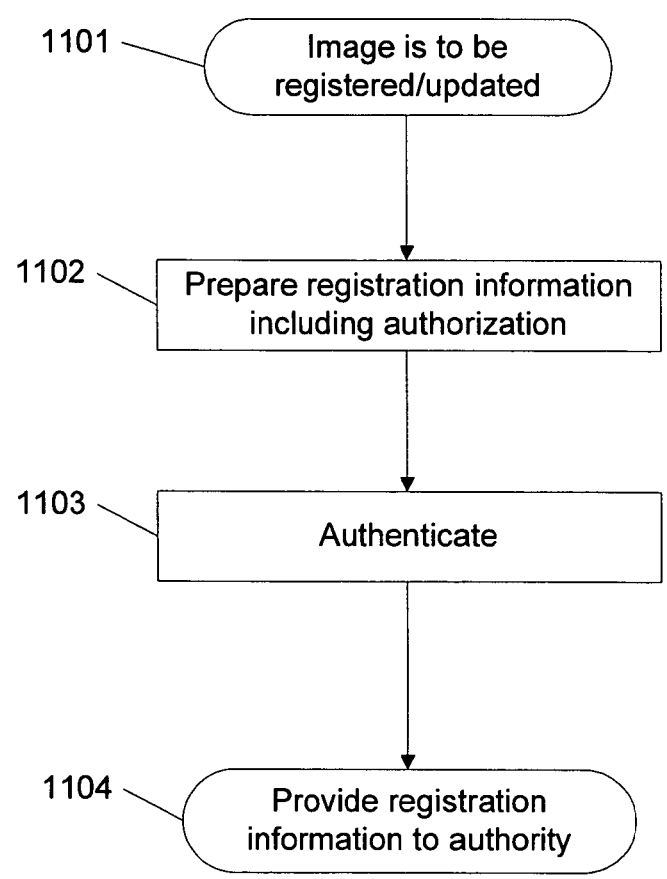
FIG. 11 is a flow diagram of a method for registering an image, according to some embodiments.

FIG. 11 is a flow diagram of a method for registering an image, according to some embodiments. In this example, an image is to be registered, or information relating to a previously registered image is to be updated (1101). Examples of an image that may be registered are trademarked images, logos, or part or all of trade dress. An example of a reason an image may be registered is to prevent fraudulent use of the image, or an image similar to the image. Examples of reasons information relating to a previously registered image may be updated include a change to the image, a modification to one or more entities authorized to use the image (or all images registered by the entity), and deletion of the image.

Registration information may be prepared (1102). Registration information may include authorization information, for example information about what entities are authorized to use the image. Examples of entities that may be authorized to use the image include the owner of the image or of the trademark expressed by the image, and designated affiliates of the owner, such as third-party marketing services. In some embodiments, authorization information may be implicit. An example of implicit authorization information is that the entity registering an image, and no other party, is authorized to use the image. In some embodiments, preparation may include an automatic process, such as automatically adding one or more authorizations. In some embodiments, preparation may include a manual process, such as receiving instructions through an application program or a web page.

The identity of the registering party may be authenticated (1103). In some embodiments, authentication may be cryptographic. An example of a cryptographic authentication is signing registration information using the private half of a public/private key pair. Another example of a cryptographic authentication is encrypting or signing registration information using a secret symmetric key shared with an image registration authority. Another example of cryptographic authentication is providing or using an SSL or TLS client certificate, for example in conjunction with SSL or TLS client authentication. In some embodiments, authentication may be based on other factors that may demonstrate identity, such as initiating a request from an authorized network address such as an authorized IP address, or providing other authentication information such as a shared secret (such as a password) or a response to a challenge. In some embodiments, authentication may include providing information relating to membership in an authenticating or insuring entity, such as a bonding organization.

Registration information, including authorization information, may be provided to an image registration authority (1104). In some embodiments, providing registration information may be combined with authentication. In some embodiments, providing registration information may be done manually, for example on a web site. In some embodiments, providing registration information may be done automatically, for example by submitting registration information via a predetermined protocol such as HTTP/HTTPS, email, or a custom protocol over a network protocol such as TCP/IP.

An image registration authority refers herein to any entity that may accept image registration information such as an image and information relating to entities authorized to use an image. In some embodiments, an image registration authority may store image registration information. In some embodiments, an image registration authority may distribute image registration information. In some embodiments, an image registration authority may be centralized. For example, an image registration authority may be associated with an anti-phishing server 105 of FIG. 1. In some embodiments, an image registration authority may be distributed, for example peer-to-peer. In some embodiments, an image registration authority may charge a fee for registering images, or for validating that a use of an image is authorized, or for detecting that a use of an image is unauthorized.

Figure 12:
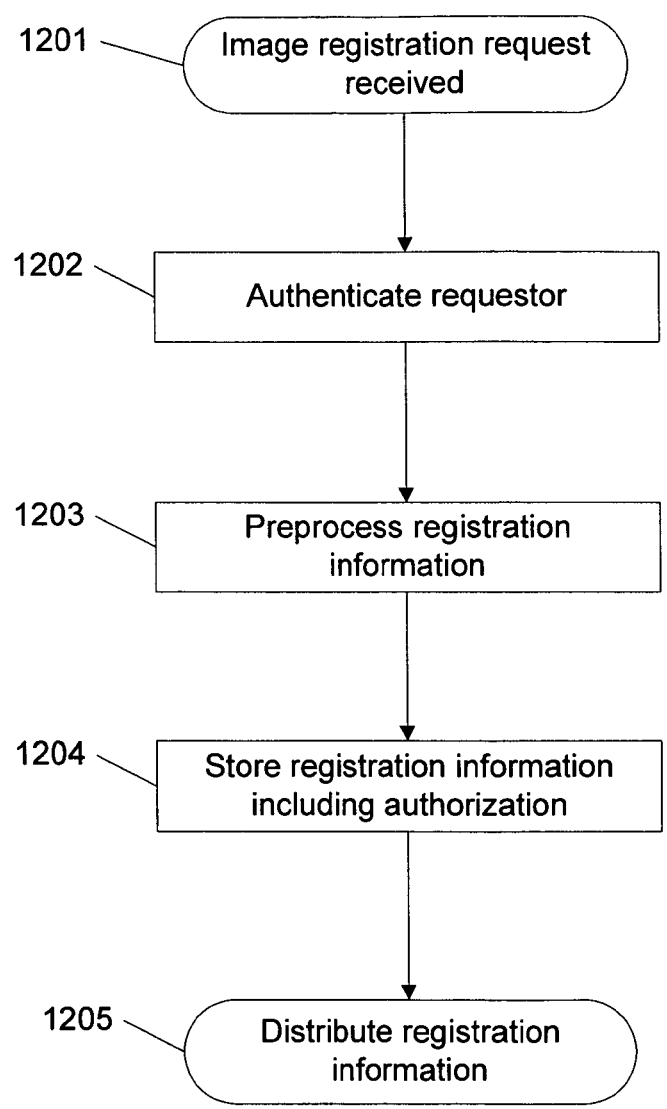
FIG. 12 is a flow diagram of a method for processing an image registration or a change to image registration information, according to some embodiments.

FIG. 12 is a flow diagram of a method for processing an image registration or a change to image registration information, according to some embodiments. In some embodiments, the method of FIG. 12 may be performed by an image registration authority. In this example, an image registration request is received (1201). An example of an image registration request is a request provided as described in conjunction with 1104 of FIG. 11. Another example of an image registration request is a report of one or more "known bad" images that have been determined to be associated with a fraudulent document, such as adulterated images similar to registered images.

The requestor may be authenticated (1202). In some embodiments, authentication may be cryptographic. An example of a cryptographic authentication is verifying a cryptographic signature using the public half of a public/private key pair. Another example of a cryptographic authentication is decrypting or verifying a signature on registration information using a secret symmetric key shared with the requestor. Another example of cryptographic authentication is verifying an SSL or TLS client certificate, for example in conjunction with SSL or TLS client authentication. In some embodiments, authentication may be based on other factors that may demonstrate identity, such as verifying that a request was initiated from an authorized network address such as an authorized IP address, or verifying other authentication information such as a shared secret (such as a password) or a response to a challenge. In some embodiments, authentication may include verifying membership in an authenticating or insuring entity, such as a bonding organization.

In some embodiments, registration information may be preprocessed (1203). An example of preprocessing registration information is to process an image to precompute information that may be used for subsequent image matching. One example of precomputing information that may be used for subsequent image matching is canonicalizing an image to one or more canonical geometries and/or color mappings. Another example of precomputing information that may be used for subsequent image matching is hashing contents of an image, for example using a cryptographic hash such as SHA1 or MD5. Another example of precomputing information that may be used for subsequent image matching is creating sub-images corresponding to regions of the image, for example regions of 8×8 pixels at all 64 possible alignments in two dimensions. Another example of precomputing information that may be used for subsequent image matching is to extract features that characterize the image. In some embodiments, one or more indices may be based on extracted features. For example, indices may be built for substrings of extracted features, for example using prefix codes. Another example of precomputing information that may be used for subsequent image matching is precomputing information that may be useful in subsequent approximate hashing or sub-image retrieval.

Image registration information, optionally including preprocessed information as described in conjunction with 1203, may be stored in an image registry (1204). An image registry refers herein to any storage for information relating to registered images. An example of an image registry is one or more files in persistent storage such as disk storage. Another example of an image registry is a database, for example a database that is addressable by some aspect of the content of the image registration information, such as the image, or a characterization or canonicalization of the image such as preprocessed information as described in conjunction with 1203. In some embodiments, a "known bad" image may be marked as such. In some embodiments, a "known bad" image may be stored in an image registry for exact matching only.

In some embodiments, image registration information, optionally including preprocessed information as described in conjunction with 1203, may be distributed (1205). An example of distributing the image registration information is to transmit it to one or more customers, for example customers who may subsequently use the image registration information to determine whether a use of an image is registered, for example as described in conjunction with FIG. 14. In some embodiments, an authority distributing image registration information may include authentication information such as a cryptographic signature created using the private half of a public/private key pair or another authentication mechanism such as those described in conjunction with 1103 of FIG. 11.

Figure 13:
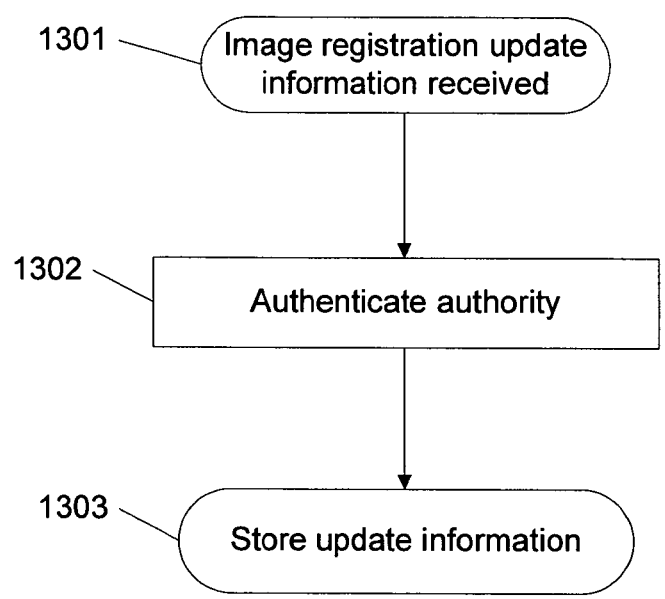
FIG. 13 is a flow diagram of a method for updating image registration information, according to some embodiments.

FIG. 13 is a flow diagram of a method for updating image registration information, according to some embodiments. In this example, image registration information is received (1301). In some embodiments, image registration information may be received from an image registration authority, for example an image registration authority that has distributed the image registration information as described in conjunction with 1205 of FIG. 12.

An image registration authority associated with the registration information may be authenticated (1302), for example by verifying a cryptographic signature using the public half of a public/private key pair or by another mechanism such as those described in conjunction with 1202 of FIG. 12.

The image registration information may be stored in an image registry (1303). Examples of storing image registration information in an image registry are discussed in conjunction with 1204 of FIG. 12.

Figure 14:
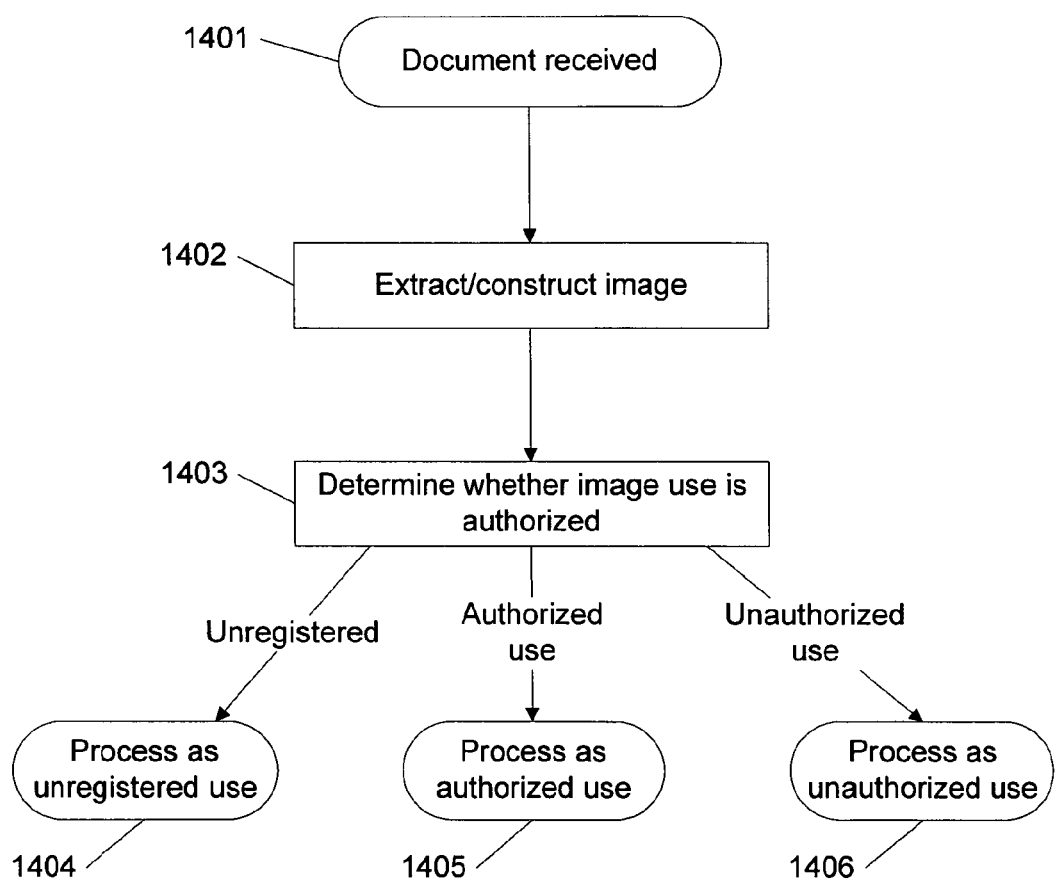
FIG. 14 is a flow diagram of a method for determining whether a use of an image is authorized, according to some embodiments.

FIG. 14 is a flow diagram of a method for determining whether a use of an image is authorized, according to some embodiments. In this example, a document is received (1401). An example of receiving a document is to receive a message such as an email. Another example of receiving a document is to receive a web page or other document from a server such as a web server. An example of a server is a document server 104 of FIG. 1.

An image may be extracted or constructed from the document (1402). In some embodiments, one or more images in the document, such as GIF, PNG, BMP, TIF and/or JPEG images, may be extracted and processed as described below. In some embodiments, a document may be rendered, for example by rendering a document description language such as HTML, and a resultant rendering, or one or more sub-images thereof, may be used as constructed image(s). An example of a sub-image that may be constructed is a sub-image including contiguous and/or overlapping imagery. Examples of operations that may be performed during rendering include any rendering operation permitted by a document description language, such as rendering frames, rendering based on cascading style sheets or layers, composition of an image from multiple sub-images, or rendering of stacked images containing one or more transparent or translucent regions. In some embodiments, one or more scripts associated with the document, such as Javascript scripts, may be executed as part of, or prior to, the rendering process. In some embodiments, one or more scripts such as Javascript scripts may be prevented from executing, or may be restricted in capabilities, following the rendering process. An example of restricting a capability of a script is to not allow a script to change the visual appearance of a document, for example by disallowing changes to elements of a Document Object Model.

It may be determined whether the use of an image is authorized (1403). In some embodiments, determination of whether a use of an image is authorized may depend on the entity using the image. Examples of an entity using the image include the sender of a message associated with the document, and a web site or domain containing the document. In some embodiments, the identity of an entity may be considered determined only if the entity is authenticated. Examples of authenticating an entity using an image, wherein the image is associated with an email, include verified cryptographic signing, origination-based authentication mechanisms such as SPF or Sender ID, and domain authentication mechanisms such as Domain Keys. An example of authenticating an entity using an image, wherein the image is associated with a web page, is to verify an identity in an X.509 certificate, such as an SSL or TLS certificate.

One example of determining whether a use of an image is authorized is to query an image registration authority. One example of querying an image registration authority is to provide the image, or a characterization of the image, to the image registration authority, receive information about zero or more entities who are authorized to use the image, and verify against the entity using the image. Another example of querying an image registration authority is to provide the image, or a characterization of the image, and the identity of an entity using the image, to the image registration authority, and receive information about whether the image registration authority is authorized to use the image. An example of the operation of an image registration authority in responding to such a query is described in conjunction with FIG. 15.

Another example of determining whether a use of an image is authorized is to determine whether the image matches information in an image registry, and determining authorization information associated with one or more matching images in the image registry if so.

One example of determining whether the image matches information in an image registry is to compute a hash of the image and determining whether the registry contains an image with the same hash value.

Another example of determining whether the image matches information in an image registry is to determine whether an approximate match for the image is contained in the image registry. One example of determining an approximate match is to use an approximate hash, for example as described in Venkatesan, Koon, Jabukowski and Moulin, "Robust Image Hashing," available in the *Proceedings of the 2000 International Conference on Image Processing*. Another example of determining an approximate match is to perform feature extraction to derive characteristics of graphics used in imagery, and match extracted features to features associated with the registry. Feature extraction techniques are well known to those skilled in the art, for example as published in Chapter 4 of Nadler and Smith, *Pattern Recognition Engineering* (ISBN 0-471-62293-1). Another example of determining an approximate match is to canonicalize the image to one or more predetermined sizes and/or colors (for example, with a range-based lookup table for translating colors into a smaller canonical set of colors), and compare with one or more canonicalized images associated with the image registry.

Another example of determining whether the image matches information in an image registry is to determine whether a sub-region of the image matches, or approximately matches, an image in the image registry. One example of determining whether a sub-region of the image matches, or approximately matches, an image in the image registry is to check all registered images against the image at every pixel alignment, using exact and/or approximate matching.

Another example of determining whether a sub-region of the image matches, or approximately matches, an image in the image registry is to match substrings, for example by performing longest-substring matching, against each position in a string representing features extracted from a registered image, wherein information in an image registry includes substrings corresponding to substrings of extracted features, which may be indexed, for example, using prefix codes. In some embodiments, a substring match above a certain threshold may be considered an image match, or may be subjected to additional verification to determine whether an image match is found.

Another example of determining whether a sub-region of the image matches, or approximately matches, an image in the image registry is to look up canonically sized sub-images of the image, for example 8×8 blocks, and determine whether such sub-images are associated with the image registry.

Another example of determining whether a sub-region of the image matches, or approximately matches, an image in the image registry is to perform content-based sub-image retrieval. Any content-based sub-image retrieval algorithm in the literature may be employed. Such algorithms are known to those skilled in the art, and include for example those published in Luo and Nascimento, *Content-Based Image Retrieval via Hierarchical Tree Matching*, published in the 2003 Proceedings of the First ACM International Workshop on Multimedia Databases; in Del Bimbo, *Visual Information Retrieval* (ISBN 1-55860-624-6); Carson, Thomas, Belongie, Hellerstein, and Malik, *Blobworld: A System for Region-Based Image Indexing and Retrieval*, published in the 1999 Proceedings of the Third International Conference on Visual Information and Information Systems; Leung and Ng, *Multiresolution subimage similarity matching for large image databases*, published in the Proceedings of SPIE—Storage and Retrieval for Image and Video Databases VI, 1998; Li, Wang, and Wiederhold, *IRM: integrated region matching for image retrieval*, published in the Proceedings of the eighth ACM International Conference on Multimedia, 2000; Sebe, Lew, and Huijsmans, *Multi-scale sub-image search*, published in the Proceedings of the Seventh ACM International Conference on Multimedia (Part 2), 1999; and Stehling, Nascimento, and Falcão, *A compact and efficient image retrieval approach based on border/interior pixel classification*, published in the Proceedings of the Eleventh International Conference on Information and Knowledge Management, 2002.

Another example of determining whether a use of an image is authorized is to determine whether the image matches "known bad" information in an image registry, for example by determining that there is an exact match between the image, or a sub-image of the image, and a "known bad" image; and if so, determining that use of an image is unauthorized in this example.

In some embodiments, the processing described in conjunction with 1402 and 1403 may be performed once. In some embodiments, the processing described in conjunction with 1402 and 1403 may be performed multiple times, for example for each image contained in the document, or for each constructed image associated with the document.

If it is determined that no registered images are used in the document (1403), then the document is processed as a document without registered images in this example (1404). An example of processing the document as a document without registered images is to process the document in a manner consistent with a personal communication or otherwise non-fraudulent document, for example by delivering a message associated with the document, or allowing the document to be viewed.

If it is determined that one or more registered images are used in the document, and that the use of registered images, for example all registered images, is authorized (1403), then the document is processed as a document with authorized use of registered images in this example (1405). An example of processing the document as a document with authorized use of registered images is to process the document in a manner consistent with a legitimate commercial message, for example by delivering a message associated with the document, or allowing the document to be viewed. In some embodiments, a visual or audible indication may be provided that indicates that registered imagery is used by an authorized party, for example by displaying a green light or border in a window, or an iconic indication that image usage is authorized.

If it is determined that one or more registered images are used in the document, and that the use of a registered image is unauthorized (1403), then the document is processed as a document with unauthorized use of registered images in this example (1406). An example of processing the document as a document with unauthorized use of registered images is to process the document in a manner consistent with a fraudulent document such as a phishing message, for example by deleting or quarantining a message associated with the document, or providing a warning message. In some embodiments, a visual or audible indication may be provided that indicates that registered imagery is used by an unauthorized party, for example by displaying a red light or border in a window, or an iconic indication that image usage is unauthorized. In some embodiments, functionality may be restricted in sites referenced in a document associated with unauthorized use of imagery. For example, clickable links in a message such as an email may be disabled, or may trigger a warning message, or web pages associated with the document or with links in the document may be disabled, for example by disallowing form data submission and/or scripting.

In some embodiments, a document associated with unauthorized use of registered images, for example a document determined as described in conjunction with 1403 or a document reported as fraudulent and optionally verified, may have images associated with it transmitted to an image registration authority and stored in an image registry as "known bad" images, against which images in a message may be checked before employing a complete sub-image retrieval. An example of an image that could be classified as "known bad" is an adulterated image that is found to approximately match a registered image. Another example of an image that could be classified as "known bad" is an image that is a sub-image of a registered image. Such "known bad" images may be registered in an image registry, for example for later use in exact matching.

Figure 15:
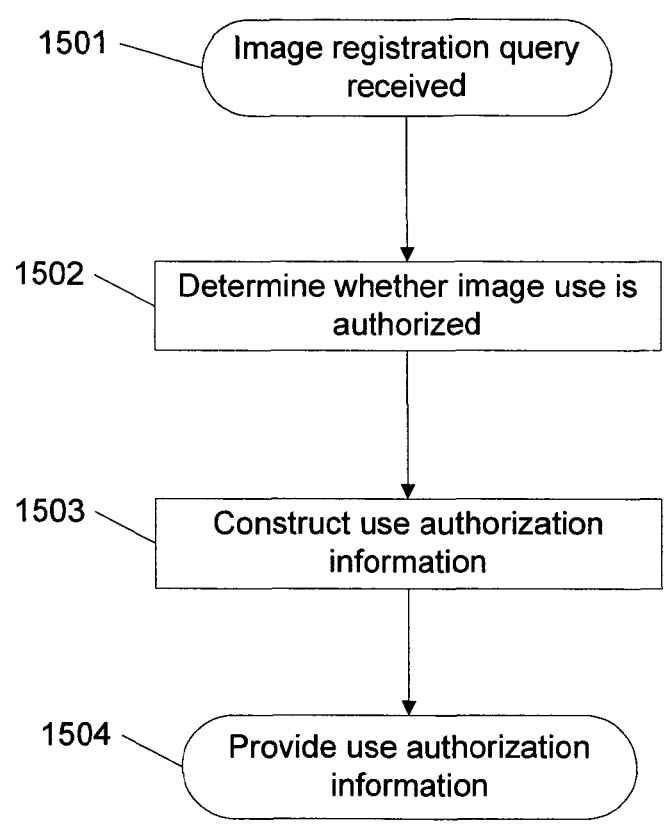
FIG. 15 is a flow diagram of a method for processing a query relating to image use authorization, according to some embodiments.

FIG. 15 is a flow diagram of a method for processing a query relating to image use authorization, according to some embodiments. In this example, an image registration query is received by an image registration authority (1501). In some embodiments, an image registration query may have been sent as described in conjunction with 1403 of FIG. 14. In some embodiments, a query may be associated with an image, or a characterization of an image. In some embodiments, a query may be associated with an image, or a characterization of an image, and the identity of an entity using the image.

It may be determined whether the query is associated with an image that matches, or approximately matches, an image in an image registry (1502). Examples of determining whether an image matches, or approximately matches, an image in an image registry are discussed in conjunction with 1403 of FIG. 14.

Use authorization information may be constructed (1503). In some embodiments, use authorization information may include information about one or more entities authorized to use images associated with the image registry that have been determined to match, or partially match, the image query. In some embodiments, in which the query includes information about an entity associated with an image usage associated with the query, it may be determined whether the entity is authorized to use one or more registered images that have been determined to match, or partially match, the query, for example all registered images that have been determined to match, or partially match, the query; and the use authorization information may include such information. Examples of use authorization information results in such embodiments include a result that no registered images are used, a result that one or more registered images are used and that the entity is authorized to use them, and a result that one or more registered images are used and that the entity is unauthorized to use some, or all, of them.

Use authorization information may be provided to the requestor (1503), for example by transmitting the use authorization information to the requestor over a network such as the internet or an intranet.

Figure 16:
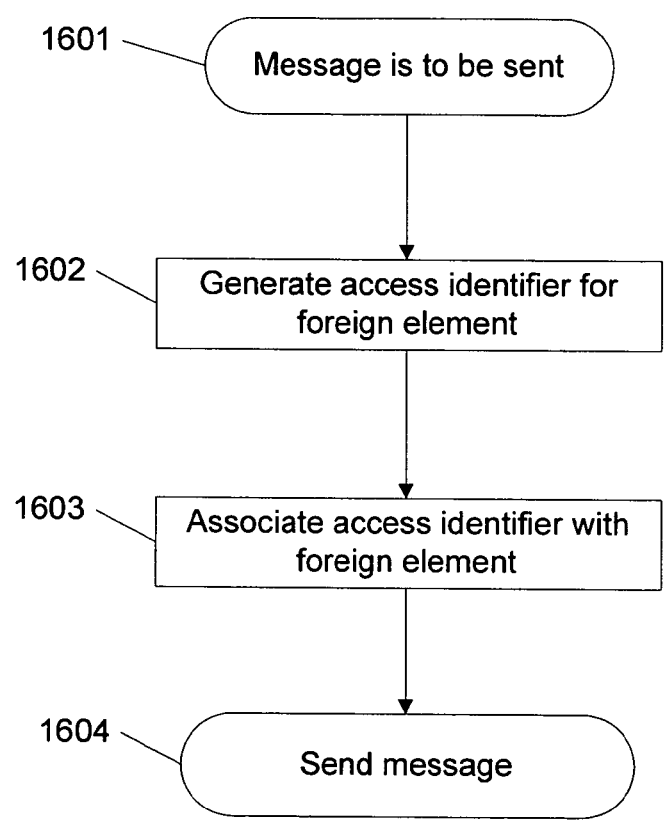
FIG. 16 is a flow diagram of a method for instituting access control for an element associated with a message, according to some embodiments.

FIG. 16 is a flow diagram of a method for instituting access control for an element associated with a message, according to some embodiments. In this example, a message is to be sent (1601). Examples of a message include an email, an MMS message and an instant message. In some embodiments, a message may be part of a bulk mailing campaign or other commercial message campaign. In this example, the message may contain one or more foreign elements. A foreign element refers herein to an element of the message that is incorporated into the message by reference rather than being included within the message. An example of a foreign element is an image such as an image incorporated into the message from a foreign server, for example using an HTML tag such as "<IMG SRC= . . . >".

An access identifier may be generated for a foreign element associated with the message (1602). One example of generating an access identifier is to randomly generate an access identifier and store it with optional additional information such as a timestamp or a number of uses, for example initialized to zero. Another example of generating an access identifier is to generate an access identifier that may be verified without storing, for example by generating a serial number (for example randomly or using a message recipient name) and using a combination of the serial number and a verifiable derivation of the serial number, and optionally other information such as a timestamp. An example of a verifiable derivation of a serial number is a cryptographically derived derivation, for example a keyed hash or an encryption using a secret key.

The access identifier may be associated with the foreign element (1603). An example of associating the access identifier with the foreign element is to include the access identifier as part of a reference to the foreign element, for example as part of the SRC argument to an IMG tag in an HTML document, such as an argument within the SRC argument. The message may be sent (1604).

Figure 17:
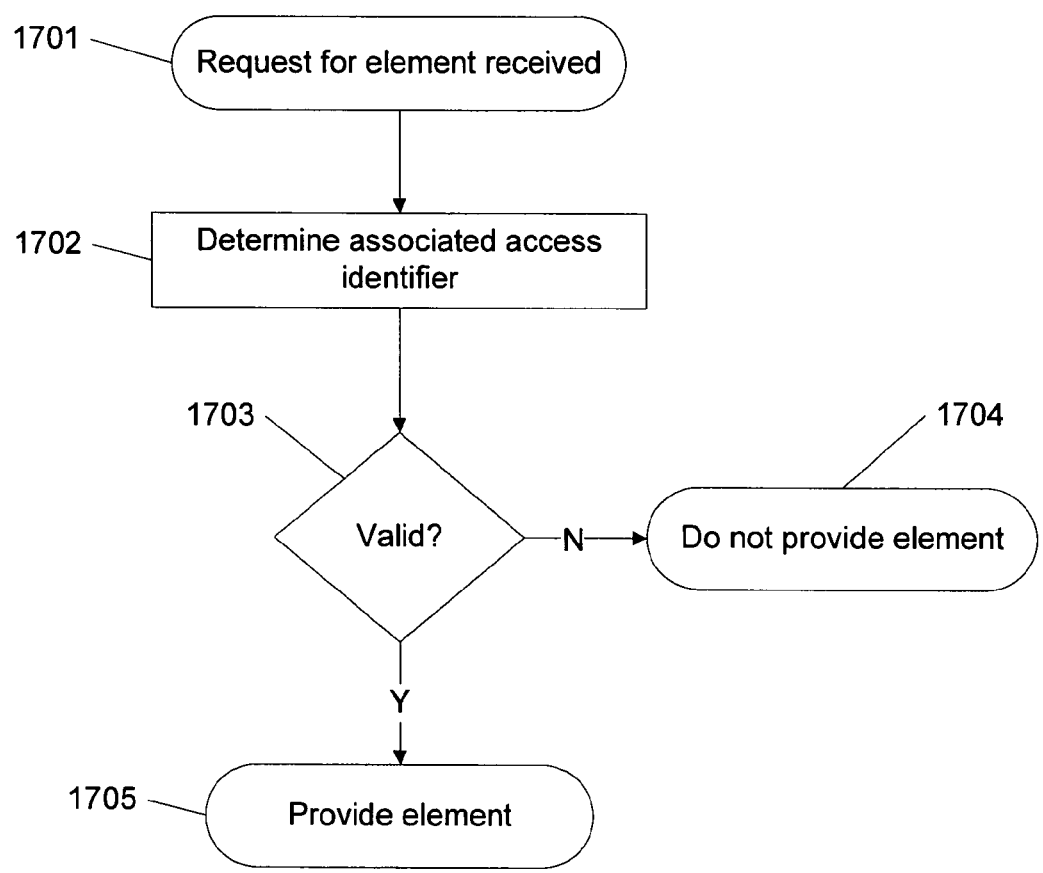
FIG. 17 is a flow diagram of a method for controlling access to an element associated with a message, according to some embodiments.

FIG. 17 is a flow diagram of a method for controlling access to an element associated with a message, according to some embodiments. In this example, a request for an element associated with a message is received (1701). An example of receiving a request is to receive an HTTP GET request for the element.

An access identifier associated with the request may be determined (1702). An example of determining an access identifier is to derive the access identifier from the address of the requested element, for example by extracting an argument.

It may be determined whether the access identifier is valid (1703). In some embodiments, an access identifier may be validated, for example by confirming that information associated with the access identifier, such as a serial number and optional timestamp information, is properly cryptographically validated, for example by confirming a keyed hash or a decryption. Determining whether an access identifier is valid may include determining whether a time limit has been surpassed from a timestamp associated with the access identifier, or determining whether a maximum number of allowed usages has been exceeded.

If it is determined that the access identifier is not valid (1703), then the element is not provided in this example (1704). One example of not providing the element is to return an error code. Another example of not providing the element is to substitute a different element, for example an image containing an indication of unauthorized use such as the word "FRAUD."

If it is determined that the access identifier is valid (1703), then the element is provided in this example (1705). An example of providing the element is to transmit the element to the requestor. In some embodiments, information relating to the access identifier, such as the number of times it has been used, may be updated, for example by incrementing a usage count.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A non-transitory computer-readable medium storing instructions that, when executed by a processor of a computing device, causes the computing device to perform operations comprising:
   receiving an electronic message that includes a link corresponding to a source address for a document that is to be presented on a display of the computing device;
   determining whether the document is trustworthy based on the source address;
   if the document is determined to be trustworthy, processing the document in a first mode by retrieving the document from the source address and presenting the document on the display of the computing device, and retrieving and presenting any subsequent documents selected from the document without determining whether the subsequent documents are trustworthy; and
   if the document is determined to be untrustworthy, processing the document in a second mode that is different than the first mode, and processing any subsequent documents selected from the document in the second mode.

2. The non-transitory computer-readable medium of claim 1, wherein the source address for the document is a uniform resource locator (URL).

3. The non-transitory computer-readable medium of claim 2, wherein the instructions cause the computing device to determine whether the document is trustworthy based on one or more characters of the URL.

4. The non-transitory computer-readable medium of claim 3, wherein the instructions cause the computing device to determine whether the document is trustworthy based on whether the URL includes an embedded user name.

5. The non-transitory computer-readable medium of claim 1, wherein the instructions cause the computing device to, if the document is determined to be trustworthy, process the document in the first mode by retrieving the document from the source address and presenting the document on the display of the computing device, and retrieving and presenting a second document subsequently selected from the same domain as the document.

6. The non-transitory computer-readable medium of claim 1, wherein the instructions cause the computing device to, if the document is determined to be trustworthy, process the document in the first mode by retrieving the document from the source address and presenting the document on the display of the computing device with a visual indication that the document is trustworthy.

7. The non-transitory computer-readable medium of claim 1, wherein the instructions cause the computing device to, if the document is determined to be trustworthy, process the document in the first mode by enabling form submissions associated with the document.

8. The non-transitory computer-readable medium of claim 1, wherein the instructions cause the computing device to, if the document is determined to be untrustworthy, process the document in the second mode by retrieving the document from the source address and presenting the document on the display of the computing device with a visual indication that the document is untrustworthy.

9. The non-transitory computer-readable medium of claim 1, wherein the instructions cause the computing device to, if the document is determined to be untrustworthy, process the document in the second mode by issuing a warning before retrieving the document from the source address and presenting the document on the display of the computing device.

10. A computing device comprising:
a display device;
a memory resource storing instructions; and
a processor coupled to the display device and the memory resource, the processor executing the instructions to cause the computing device to perform operations comprising:
receiving an electronic message that includes a link corresponding to a source address for a document that is to be presented on the display device;
determining whether the document is trustworthy based on the source address;
if the document is determined to be trustworthy, processing the document in a first mode by retrieving the document from the source address and presenting the document on the display device, and retrieving and presenting any subsequent documents selected from the document without determining whether the subsequent documents are trustworthy; and
if the document is determined to be untrustworthy, processing the document in a second mode that is different than the first mode, and processing any subsequent documents selected from the document in the second mode.

11. The computing device of claim 10, wherein the source address for the document is a uniform resource locator (URL).

12. The computing device of claim 11, wherein the computing device determines whether the document is trustworthy based on one or more characters of the URL.

13. The computing device of claim 12, wherein the computing device determines whether the document is trustworthy based on whether the URL includes an embedded user name.

14. The computing device of claim 10, wherein the computing device, if the document is determined to be trustworthy, processes the document in the first mode by retrieving the document from the source address and presenting the document on the display device, and retrieving and presenting a second document subsequently selected from a same domain as the document.

15. The computing device of claim 10, wherein the computing device, if the document is determined to be trustworthy, processes the document in the first mode by retrieving the document from the source address and presenting the document on the display device with a visual indication that the document is trustworthy.

16. The computing device of claim 10, wherein the computing device, if the document is determined to be untrustworthy, processes the document in the second mode by disabling form submissions associated with the document.

17. The computing device of claim 10, wherein the computing device, if the document is determined to be untrustworthy, processes the document in the second mode by retrieving the document from the source address and presenting the document on the display device with a visual indication that the document is untrustworthy.

18. The computing device of claim 10, wherein the computing device, if the document is determined to be untrustworthy, processes the document in the second mode by issuing a warning before retrieving the document from the source address and presenting the document on the display device.

\* \* \* \* \*